(No Model.)
F. WARNOCK.
COUPLING FOR PNEUMATIC TIRES.
No. 605,156.
Patented June 7, 1898.
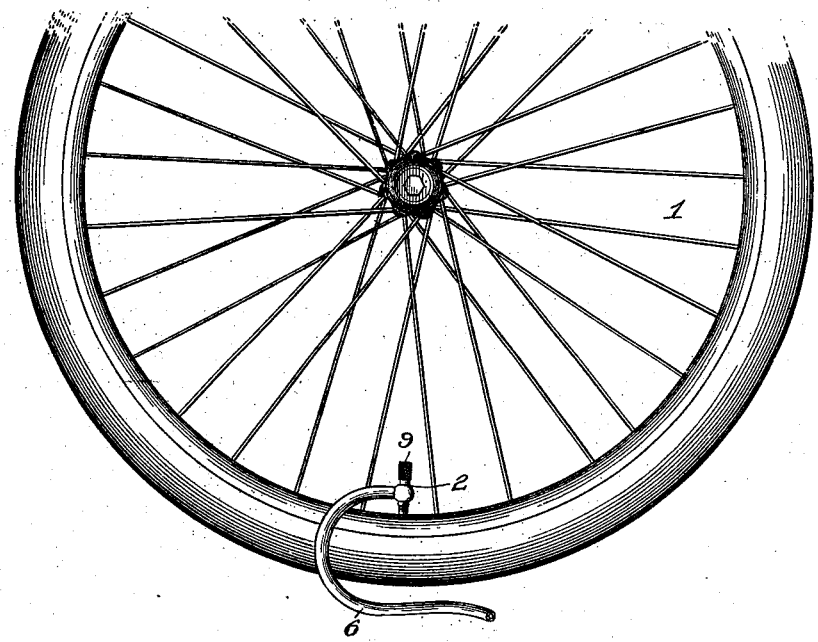
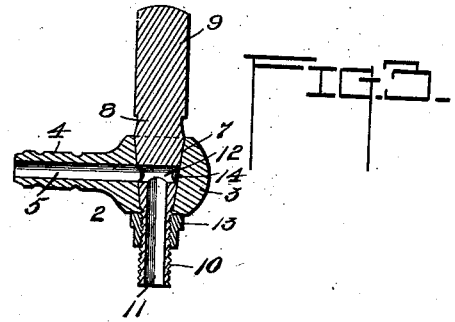
Witnesses
Inventor
Frank Warnock.
By his Attorneys,

# UNITED STATES PATENT OFFICE.

FRANK WARNOCK, OF ELYRIA, OHIO.

COUPLING FOR PNEUMATIC TIRES.

SPECIFICATION forming part of Letters Patent No. 605,156, dated June 7, 1898.

Application filed February 3, 1897. Serial No. 621,822. (No model.)

*To all whom it may concern:*

Be it known that I, FRANK WARNOCK, a citizen of the United States, residing at Elyria, in the county of Lorain and State of Ohio, have invented a new and useful Coupling for Connecting an Air-Pump with a Pneumatic Tire, of which the following is a specification.

The subject-matter of this invention is an attachment to facilitate the application of an inflating device to a pneumatic tire or other article to be expanded by charging it with air or other fluid under pressure.

The device consists of a coupling comprising a casing having a tapering opening and a stem longitudinally bored and adapted to receive the tube for conveying the air or fluid under pressure to the part to be inflated, and a pin having a tapering portion rotatably mounted in the tapering opening of the casing and having a screw-threaded extension to make detachable connection with the valve of the part to be inflated, and having an annular passage in communication with the stem of the casing and with the bore of the pin, whereby communication is had at all times between the pump or inflating device and the part to be inflated, and a nut mounted upon the threaded extension to hold the pin in place and provide for taking up wear.

For a full understanding of the merits and advantages of the invention, reference is to be had to the accompanying drawings and the following description.

The improvement is susceptible of various changes in the form, proportion, and the minor details of construction without departing from the principle or sacrificing any of the advantages thereof, and to a full disclosure of the invention an adaption thereof is shown in the accompanying drawings, in which—

Figure 1 is an elevation of a pneumatic-tired wheel, the upper portion being broken away, showing the invention applied. Fig. 2 is a perspective view of the improved coupling. Fig. 3 is a central longitudinal section thereof.

Corresponding and like parts are referred to in the following description and indicated in the several views of the drawings by the same reference characters.

Inasmuch as the invention is chiefly designed to be used in connection with pneumatic wheels it is illustrated in this relation in the accompanying drawings, in which the numeral 1 represents a wheel of ordinary form supplied with a pneumatic tire and the usual valve, with which the coupling 2 is detachably connected by a screw-thread connection in the manner presently to be described at length.

The coupling consists of a casing 3, having an offstanding stem 4, which is longitudinally bored, as shown at 5, and which is exteriorly grooved to retain thereon a tube 6, which is applied thereto in the usual way by forcing it upon the extension, as will be readily understood. The casing is formed with a tapering opening in communication with the bore 5, and which receives the tapering portion 7 of a pin 8, rotatably mounted therein. The opposite end portions of the pin extend beyond the casing, the upper portion 9 being milled to enable the fingers to grip the same firmly when rotating the pin to connect it with or remove it from the valve of the tire or part to be inflated. The lower end portion 10 of the pin is externally threaded and is formed with a bore 11, which communicates at its inner end with a transverse opening 12 of the tapered portion of the pin, and a nut 13 is mounted upon the part 10 and, engaging with the lower side of the casing, holds the pin in place and is adapted to be turned up so as to take up any wear between the tapering part 7 and its seat in the casing 3. An annular groove 14 is formed in the tapering part 7 and communicates with the ends of the opening 12 and is disposed so as to register with the longitudinal bore 5 of the stem 4, thereby establishing communication at all times between the bores 5 and 11.

The flexible tube 6 being firmly attached at one end to the stem 4 and at its opposite end to the pump or other inflating means, the advantage of having the pin 9 rotatably mounted in the casing will be apparent at once, since it enables the tube 6 to be connected with the tire or part to be inflated without requiring the part to which the tube is directly attached being turned, which would be inconvenient with the tube 6 applied thereto. The construction illustrated admits of the casing being held while the pin can be turned to connect the inflating means with the part to be inflated.

The coupling is effective for the purpose designed, can be cheaply manufactured, occupies a comparatively small space, obviates leaky joints, and results in prolonging the usefulness of the tube connecting the pump with the tire or part to be inflated, since it is not required to twist or turn the said tube when applying the pump or disconnecting it from the part when properly inflated.

Having thus described the invention, what is claimed as new is—

The herein-described coupling for the purposes set forth, comprising a casing having a tapering opening and a longitudinally-bored stem, a pin rotatably mounted in the tapering opening and having its end portions exterior to the casing and its intermediate portion of a corresponding taper to snugly fit the tapering opening, exteriorly grooved, and formed with a transverse opening, and having a projecting end portion exteriorly threaded and longitudinally bored, and a nut mounted upon the threaded end portion to hold the pin in place and provide for taking up wear, substantially as set forth.

In testimony that I claim the foregoing as my own I have hereto affixed my signature in the presence of two witnesses.

FRANK WARNOCK.

Witnesses:
 CHAS. A. METCALF,
 R. E. BRAMAN.